(12) United States Patent
Zhu

(10) Patent No.: US 10,556,180 B2
(45) Date of Patent: Feb. 11, 2020

(54) METHOD AND SYSTEM OF MOVING CHARACTER IN ONLINE GAME

(71) Applicant: TENCENT TECHNOLOGY (SHENZHEN) COMPANY LIMITED, Shenzhen, Guangdong (CN)

(72) Inventor: Xiaoyin Zhu, Shenzhen (CN)

(73) Assignee: Tencent Technology (Shenzhen) Co. Ltd., Shenzhen, Guangdong (CN)

( * ) Notice: Subject to any disclaimer, the term of this patent is extended or adjusted under 35 U.S.C. 154(b) by 604 days.

(21) Appl. No.: 15/350,824

(22) Filed: Nov. 14, 2016

(65) Prior Publication Data

US 2017/0056773 A1 Mar. 2, 2017

Related U.S. Application Data

(63) Continuation of application No. PCT/CN2015/079459, filed on May 21, 2015.

(30) Foreign Application Priority Data

May 21, 2014 (CN) .......................... 2014 1 0216094

(51) Int. Cl.
*A63F 13/00* (2014.01)
*A63F 13/56* (2014.01)
*A63F 13/355* (2014.01)

(52) U.S. Cl.
CPC ............ *A63F 13/56* (2014.09); *A63F 13/355* (2014.09)

(58) Field of Classification Search
CPC ................................ A63F 13/56; A63F 13/355
See application file for complete search history.

(56) References Cited

U.S. PATENT DOCUMENTS 5,808,887 A * 9/1998 Dorst ..................... B25J 9/1666
345/474
6,319,129 B1 * 11/2001 Igarashi .................. A63F 13/10
463/31

(Continued)

FOREIGN PATENT DOCUMENTS

CN          1941788 A       4/2007
CN        102682466 A       9/2012

(Continued)

OTHER PUBLICATIONS

With restriction of microphone MAKUSHA freelancer, game coding completeness, Japan, Softbank creative incorporated company, Apr. 6, 2010, first edition, p. 590-p. 591, p. 597-p. 599.

(Continued)

*Primary Examiner* — James S. McClellan
*Assistant Examiner* — Kevin M Carter
(74) *Attorney, Agent, or Firm* — BakerHostetler

(57) ABSTRACT

The present disclosure provides a method and a system of moving a character in an online game. The method includes: receiving, by a first client, a movement instruction for a specified character, where the movement instruction includes a destination grid, acquiring a game map including a marked dynamic blocking grid, where the marked dynamic blocking grid is a dynamic blocking grid on which a game character exists, establishing an optimal path from a current start grid on which the specified character is located to the destination grid specified in the movement instruction without traveling through the marked dynamic blocking grid, generating movement information including the specified character and the optimal path, and sending the movement information to a server; and receiving, by the server, the movement information sent by the first client, and sending (Continued)

the movement information to all clients except the first client by group messaging.

16 Claims, 5 Drawing Sheets

(56) References Cited

U.S. PATENT DOCUMENTS

| | | | |
|---|---|---|---|
| 8,366,554 B1 | 2/2013 | Yuan | |
| 9,149,724 B2 | 10/2015 | Liu et al. | |
| 2003/0058238 A1* | 3/2003 | Doak | G06T 19/00 345/419 |
| 2005/0159216 A1* | 7/2005 | Chiu | A63F 13/10 463/31 |
| 2005/0246711 A1* | 11/2005 | Berstis | G06F 9/5061 718/105 |
| 2007/0094325 A1* | 4/2007 | Ih | A63F 13/12 709/203 |
| 2007/0218992 A1* | 9/2007 | Maehiro | A63F 13/00 463/31 |
| 2008/0231628 A1* | 9/2008 | Shearer | G06T 15/50 345/419 |
| 2008/0296839 A1* | 12/2008 | Washer | A63F 3/00075 273/262 |
| 2009/0102860 A1* | 4/2009 | Yoshiike | A63F 13/10 345/619 |
| 2009/0104990 A1* | 4/2009 | Tsujino | A63F 13/04 463/32 |
| 2011/0010083 A1* | 1/2011 | Lee | G05D 1/0274 701/532 |
| 2014/0057717 A1* | 2/2014 | Yoshikawa | A63F 13/35 463/31 |
| 2014/0073435 A1* | 3/2014 | Liu | A63F 13/822 463/42 |

FOREIGN PATENT DOCUMENTS

| | | |
|---|---|---|
| CN | 103593546 A | 2/2014 |
| CN | 103716237 A | 4/2014 |
| CN | 103957224 A | 7/2014 |
| JP | 2005342360 A | 12/2005 |
| JP | 2009056181 A | 3/2009 |
| JP | 2013180000 | 9/2013 |
| KR | 20040010038 A | 1/2004 |

OTHER PUBLICATIONS

English translation of the Notification of the First Office Action of Japanese application No. 2016-548212, dated Jun. 13, 2017.
A Dynamic Path-Finding Method Avoiding Moving Obstacles in 3D Game Environment, 1 people, and the treatise sixth vol. third call (Sep. 2006).
English translation of the Notification of the First Office Action of Korean application No. 10-2016-7034516, dated Apr. 19, 2018.
Notification of the First Office Action of Korean application No. 10-2016-7034516, dated Apr. 19, 2018.
International Search Report in international application No. PCT/CN2015/079459, dated Sep. 2, 2015.
English Translation of the Written Opinion of the International Search Authority in international application No. PCT/CN2015/079459, dated Sep. 2, 2015.
Office Action issued in Chinese Application No. 201410216094.6, dated Mar. 25, 2019.

* cited by examiner

METHOD AND SYSTEM OF MOVING CHARACTER IN ONLINE GAME

CROSS REFERENCE TO RELATED APPLICATIONS

This is a continuation application of International Patent Application No. PCT/CN2015/079459, filed on May 21, 2015, which claims priority to Chinese Patent Application No. 201410216094.6 filed on May 21, 2014, the disclosures of which are incorporated by reference herein in their entirety.

FIELD OF THE TECHNOLOGY

The present disclosure relates to the field of online games, and in particular, to a method and a system of moving a character in an online game.

BACKGROUND OF THE DISCLOSURE

At present, the Internet provides shared webpage data, and further can provide online games, for example, a massively multiplayer online game (MMOG), and browser games are also included. Generally, online games are developed for relief of fatigue of users. When a user is fatigued during work, the user only needs to take a short time to download and install an online game client, to play an online multiplayer game.

For an existing game system constructed by a server and multiple clients, the online game clients and server only support exchange of a small amount of data to implement some simple operations, for example, control a game character to release a skill and control the game character to move. For an existing game map provided by an online game, multiple game characters can exist on a grid on the game map, that is, the game characters overlap on the same grid; further, when it is required to move a game character to a destination grid, a path with a shortest distance to the destination grid is directly established, and along the path, the game character directly travels through a game character on the path and reaches the destination grid, where the interval between the game characters is not reflected, lacking sense of reality.

SUMMARY

The objective of the present disclosure is to provide a method and a system of moving a character in an online game, so as to solve the problem that one game character travels through another when traveling along a path established based on an existing game map provided by an online game.

According to an aspect, the present disclosure provides a method of moving a character in an online game, applied to a system of moving a character constructed by a server and at least two clients, the method of moving a character in an online game including:

receiving, by a first client, a movement instruction for a specified character, the movement instruction including a destination grid, and the clients including the first client;

acquiring, by the first client, a game map including a marked dynamic blocking grid, the marked dynamic blocking grid being a dynamic blocking grid on which a game character exists;

establishing, by the first client, an optimal path from a current start grid on which the specified character is located to the destination grid specified in the movement instruction without traveling through the marked dynamic blocking grid, generating movement information including the specified character and the optimal path, and sending the movement information to the server; and receiving, by the server, the movement information sent by the first client, and sending the movement information to all clients except the first client by group messaging.

According to an aspect, the present disclosure provides a system of moving a character in an online game, including a server, and further including at least two clients, the clients including a first client, the first client being configured to receive a movement instruction for a specified character, the movement instruction including a destination grid;

the first client being further configured to acquire a game map including a marked dynamic blocking grid, the marked dynamic blocking grid being a dynamic blocking grid on which a game character exists;

the first client being further configured to establish an optimal path from a current start grid on which the specified character is located to the destination grid specified in the movement instruction without traveling through the marked dynamic blocking grid, generate movement information including the specified character and the optimal path, and send the movement information to the server; and the server being configured to receive the movement information sent by the first client, and send the movement information to all clients except the first client by group messaging.

The beneficial effect of the present disclosure is: A dynamic blocking grid is added based on an existing game map provided by an online game, and if one game character exists on the dynamic blocking grid, the dynamic blocking grid is marked, so that when an optimal path from a current start grid to a destination grid is established, the marked dynamic blocking grid is avoided, and further, when a specified character is controlled to move along the optimal path, a scene in which one game character travels past another rather than a scene in which the specified character travels through another game character is presented, having more sense of reality.

BRIEF DESCRIPTION OF THE DRAWINGS

To illustrate the technical solutions in the embodiments of the present invention more clearly, the following briefly introduces the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In order to make the objectives, technical solutions, and advantages of the present disclosure more comprehensible, the present disclosure is described in further detail below with reference to the accompanying drawings and embodiments. It should be understood that, the specific embodiments described herein are merely used for explaining the present disclosure rather than limiting the present disclosure. The technical solutions in the present disclosure are described below by using specific embodiments.

In the embodiments of the present invention, a game map provided based on an online game is formed by grids. The manner of grid division on the game map is not limited, and the size of different grids divided from the game map is not limited, either. It should be noted that, the online game in the embodiments of the present invention includes at least an MMOG and a browser game. The MMOG is a game in which multiple players are simultaneously online. After a client is installed, each game player can log in to a server by using the client, thereby achieving that multiple players simultaneously play the game on line. For the browser game, after a client is installed in advance in a browser in a client installation manner such as adding a widget or a plug-in, a game player can log in to a server by using the client provided by the browser, thereby achieving that multiple players simultaneously play the game on line.

A method of moving a character in an online game provided in the embodiments of the present invention is applied to a system of moving a character constructed by a server and at least two clients (that is, a game system constructed by the server and the at least two clients). The clients include a first client and a second client, where the second client represents all clients except the first client. The clients further include a third client, where the third client may be the first client or any second client; and the third client is a client that sends, to the server, movement information including a wrong path for controlling a third game character to move, where the third game character is a game character controlled by the third client by using the wrong path. It should be emphasized that, to reduce the amount of data exchanged between the server and each client, if no error occurs on data such as a game map in the client or a grid on which a game character is located, each client and the server mainly perform data exchange on movement information that is generated for a game character needing to be moved. The movement information includes a specified character, a current start grid, an optimal path, start movement time, and a movement speed; therefore, the data amount of the movement information exchanged between each client and the server is small.

Figure 1:
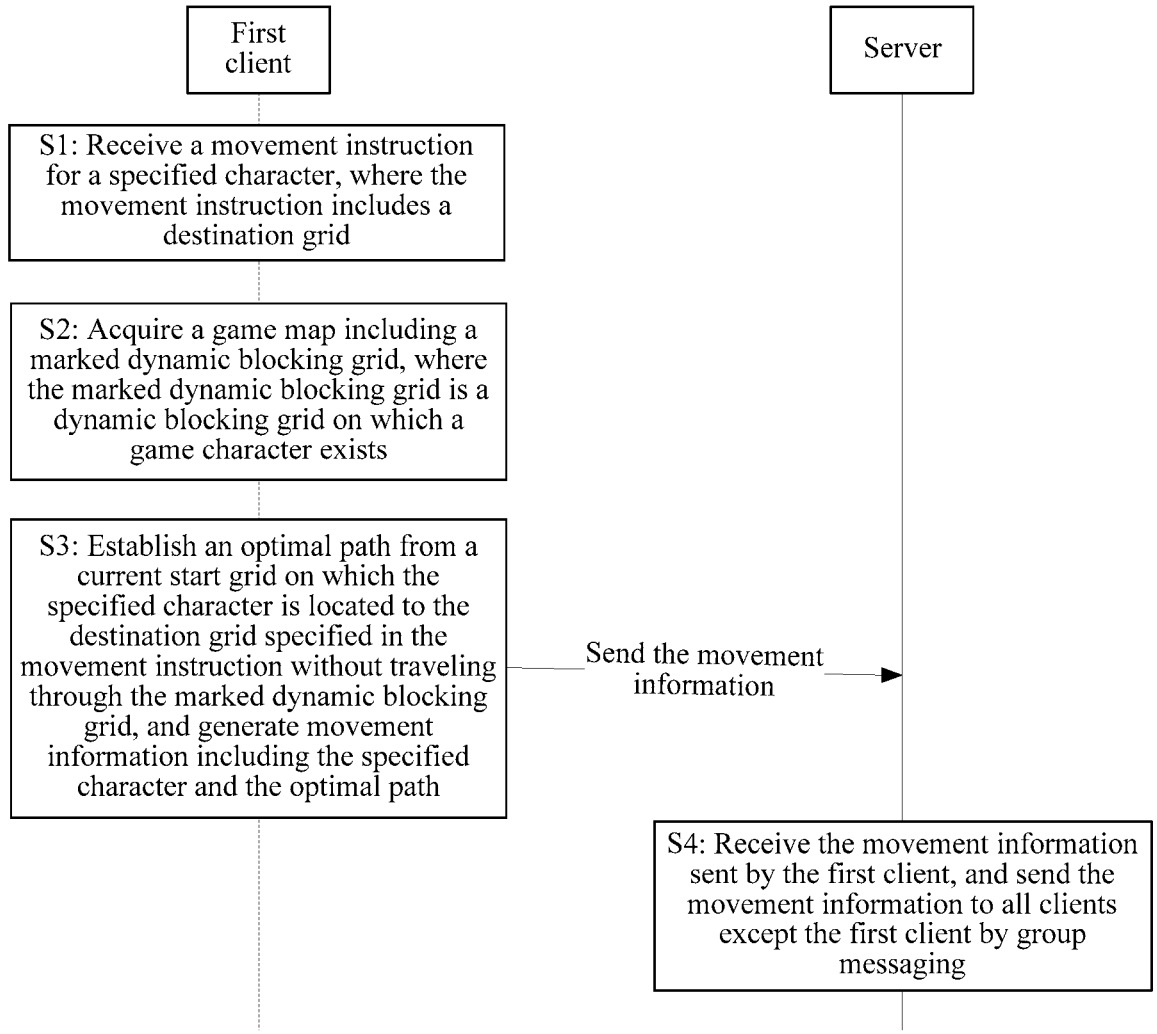
FIG. 1 is a first interaction flowchart of a method of moving a character in an online game according to an embodiment of the present invention.

FIG. 1 shows a first interaction flowchart of a method of moving a character in an online game according to an embodiment of the present invention. For ease of description, only the part related to this embodiment of the present invention is shown. The method of moving a character in an online game provided in this embodiment of the present invention includes:

S1: A first client receives a movement instruction for a specified character, where the movement instruction includes a destination grid, and clients include the first client. In this embodiment of the present invention, a game character includes the specified character; and if the first client can control one or more game characters, the specified character is a game character currently controlled by the first client.

It should be noted that, the movement instruction for controlling the specified character to move may be triggered by a game player by using a mouse or a keyboard. If the game player controls the mouse and clicks a dynamic blocking grid or a non-blocking grid on the game map, the clicked grid is used as the destination grid. Alternatively, when the game player controls, by using the keyboard, the specified character to move along a specified direction (up, down, left, or right), if along the specified direction, a grid neighboring to a grid on which the specified character currently is located is a dynamic blocking grid or a non-blocking grid, the grid neighboring to the grid on which the specified character currently is located is used as the destination grid.

The movement instruction for controlling the specified character to move may also be triggered by a game widget, where the game widget includes a code file that is programmed by a programmer in advance and used for controlling a game character, and certainly, the game widget includes a code file for controlling the specified character to move. In this case, each destination grid to which the specified character needs to be controlled to move successively is also set in a code file included by the game widget.

In addition, because the first client has recorded the grid on which the specified character currently is located on the game map (that is, a current start grid), the first client may extract, from the movement instruction, the destination grid to which the specified character is moved, that is, may draw an optimal path from the current start grid to the destination grid. The specified character may be moved from the current start grid to the destination grid by using the optimal path.

S2: The first client acquires a game map including a marked dynamic blocking grid, where the marked dynamic blocking grid is a dynamic blocking grid on which a game character exists.

Notably, compared with an existing game map provided by an online game, the game map provided in this embodiment of the present invention includes a dynamic blocking grid. The dynamic blocking grid has the following feature: If one game character exists on the dynamic blocking grid, another game character cannot be moved to the dynamic blocking grid.

In this embodiment of the present invention, when no game character exists on a dynamic blocking grid, a server does not mark the dynamic blocking grid, and the dynamic blocking grid that is not marked is used as an unmarked dynamic blocking grid. When a game character is moved to the dynamic blocking grid, the server marks the dynamic blocking grid, to obtain the marked dynamic blocking grid; and when the game character is moved out of the dynamic blocking grid, the server cancels the mark on the dynamic blocking grid, and the dynamic blocking grid is returned into the unmarked dynamic blocking grid.

S3: The first client establishes an optimal path from a current start grid on which the specified character is located to the destination grid specified in the movement instruction without traveling through the marked dynamic blocking grid, generates movement information including the specified character and the optimal path, and sends the movement information to a server.

It should be noted that, because the game map is formed by grids, the generated optimal path is also formed successively by the current start grid, grids that are successively traveled through, and the destination grid. In this way, the grids that are included on the optimal path and are successively traveled through may be used to control the specified character to move. Notably, because only one game character is allowed to exist on one dynamic blocking grid, in step S3, when a shortest path (the optimal path) from the current start grid to the destination grid is determined, the marked dynamic blocking grid is bypassed, and therefore the optimal path does not include the marked dynamic blocking grid, that is, for a shortest path determined according to the existing technology (based on a game map with no dynamic blocking grid), if, in this embodiment of the present invention, the shortest path determined according to the existing technology includes the marked dynamic blocking grid, the optimal path according to this embodiment of the present invention travels through one or more grids neighboring to the marked dynamic blocking grid. In this way, when the specified character is moved along the optimal path that bypasses the marked dynamic blocking grid, a game scene in which one game character travels past another is presented. Therefore, one or more dynamic blocking grids are set on the entire game map, so that at a location at which a dynamic blocking grid is set, at least one game scene in which one game character travels past another is presented.

Because multiple players simultaneously play a game on line, each client and the server are both required to synchronously control the specified character to move according to the optimal path. Further, when the game player controls the specified character of the first client to move, each time the first client establishes one optimal path, the first client generates corresponding movement information and sends the movement information to the server.

S4: The server receives the movement information sent by the first client, and sends the movement information to all clients except the first client by group messaging.

Specifically, in step S4, when receiving the movement information sent by the first client, the server checks whether the movement information meets a rule, and especially needs to check whether the optimal path specified in the movement information travels through the marked dynamic blocking grid on the game map. If the movement information meets the rule, the server sends the movement information to each second client.

Therefore, while the first client directly controls, according to the established optimal path, the specified character to move, each client except the first client controls, according to the optimal path delivered by the server, the specified character to move, thereby achieving that each client controls, according to the optimal path specified in the movement information, the specified character to move synchronously.

Figure 2:
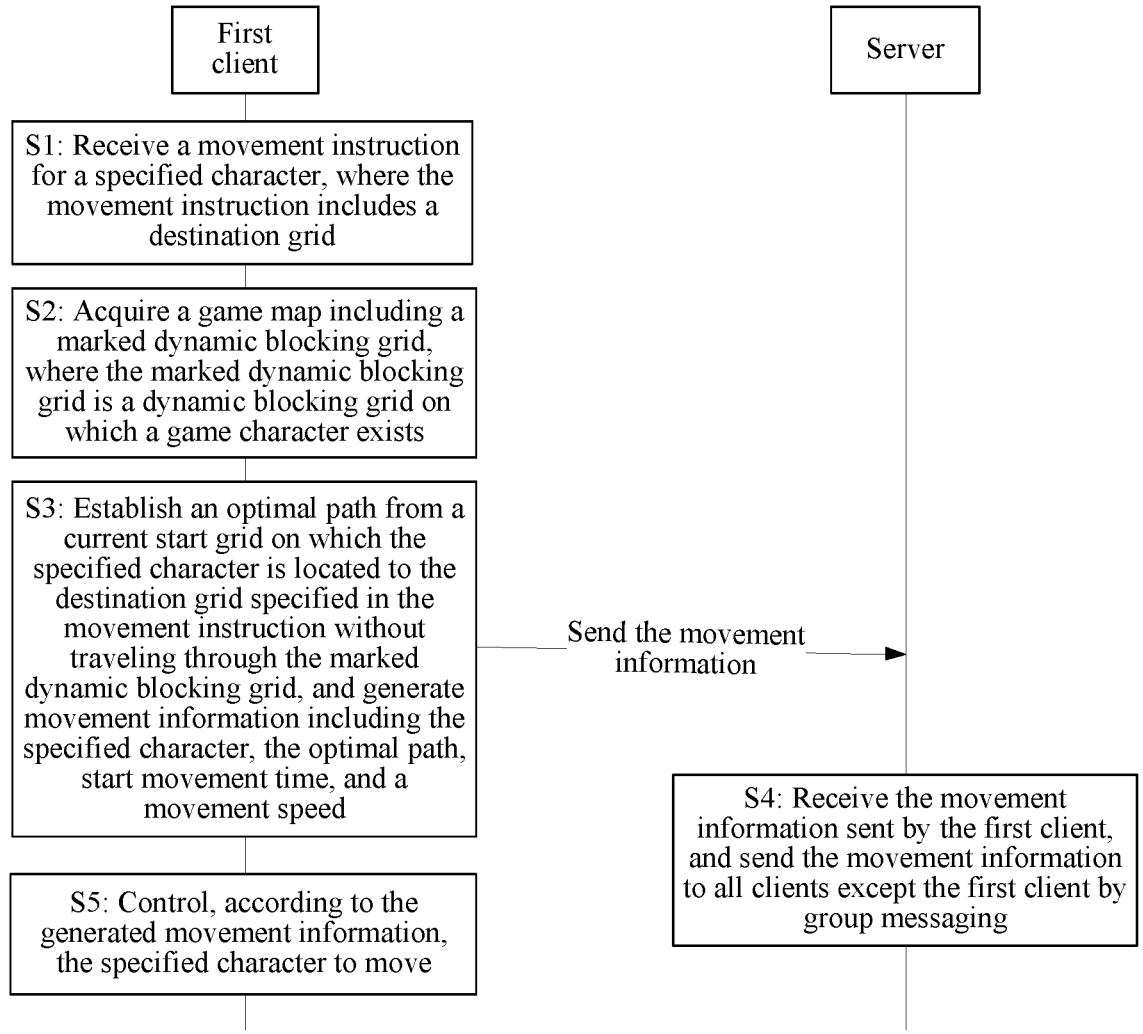
FIG. 2 is a second interaction flowchart of a method of moving a character in an online game according to an embodiment of the present invention.

In an embodiment of the present invention, FIG. 2 shows a second interaction flowchart of a method of moving a character in an online game according to an embodiment of the present invention. For ease of description, only the part related to this embodiment of the present invention is shown. Based on the first interaction flowchart of the method of moving a character in an online game, before the step of generating, by the first client, movement information including the specified character and the optimal path, the method of moving a character in an online game further includes:

generating, by the first client, movement information including the specified character, the optimal path, start movement time, and a movement speed after establishing the optimal path; and the method of moving a character in an online game further includes S5: The first client controls, according to the generated movement information, the specified character to move.

Specifically, to improve real experience of a game, once a movement instruction for controlling a specified character to move is received, the movement instruction immediately triggers generation of an optimal path to a destination grid. Moreover, after the optimal path is generated, movement information is immediately determined, so that the specified character is directly controlled by using the movement information, instead of that after the server checks whether the movement information meets a rule, the server delivers the movement information back to the first client, to trigger the first client to start to control the specified character to move along the optimal path. In this way, on a client with the first perspective (the first client), successive movement of the specified character can be experienced. Notably, after the optimal path is generated, the movement information is generated according to the specified character, the optimal path, start movement time, and a movement speed. In this way, by using the start movement time, it is ensured that the specified character controlled by each client is synchronously located on a same grid at a same moment; and by using the movement speed, synchronous control is ensured more precisely. It should be noted that, in movement information that is sent each time, a movement speed may be a newly set one, so that when the specified character is controlled by using different movement information generated at different time, the specified character can be controlled to move according to different movement speeds, thereby having more sense of reality.

Notably, the server stores a grid on which each game character is located at each moment, and a grid on which a game character controlled by each client is located should be subject to the grid, recorded by the server, on which the game character is located.

Further, in this embodiment, specifically, when the first client controls the specified character to move, after the first client uploads the movement information to the server, if the server checks that the movement information does not meet the rule, the server sends an adjustment instruction to the first client, to trigger, by using the adjustment instruction, the first client to adjust the specified character to a grid, recorded by the server, on which the specified character is located. Certainly, when the server checks that the movement information sent by the first client does not meet the rule, the server does not perform the step of sending the movement information to all clients except the first client by group messaging.

Figure 3:
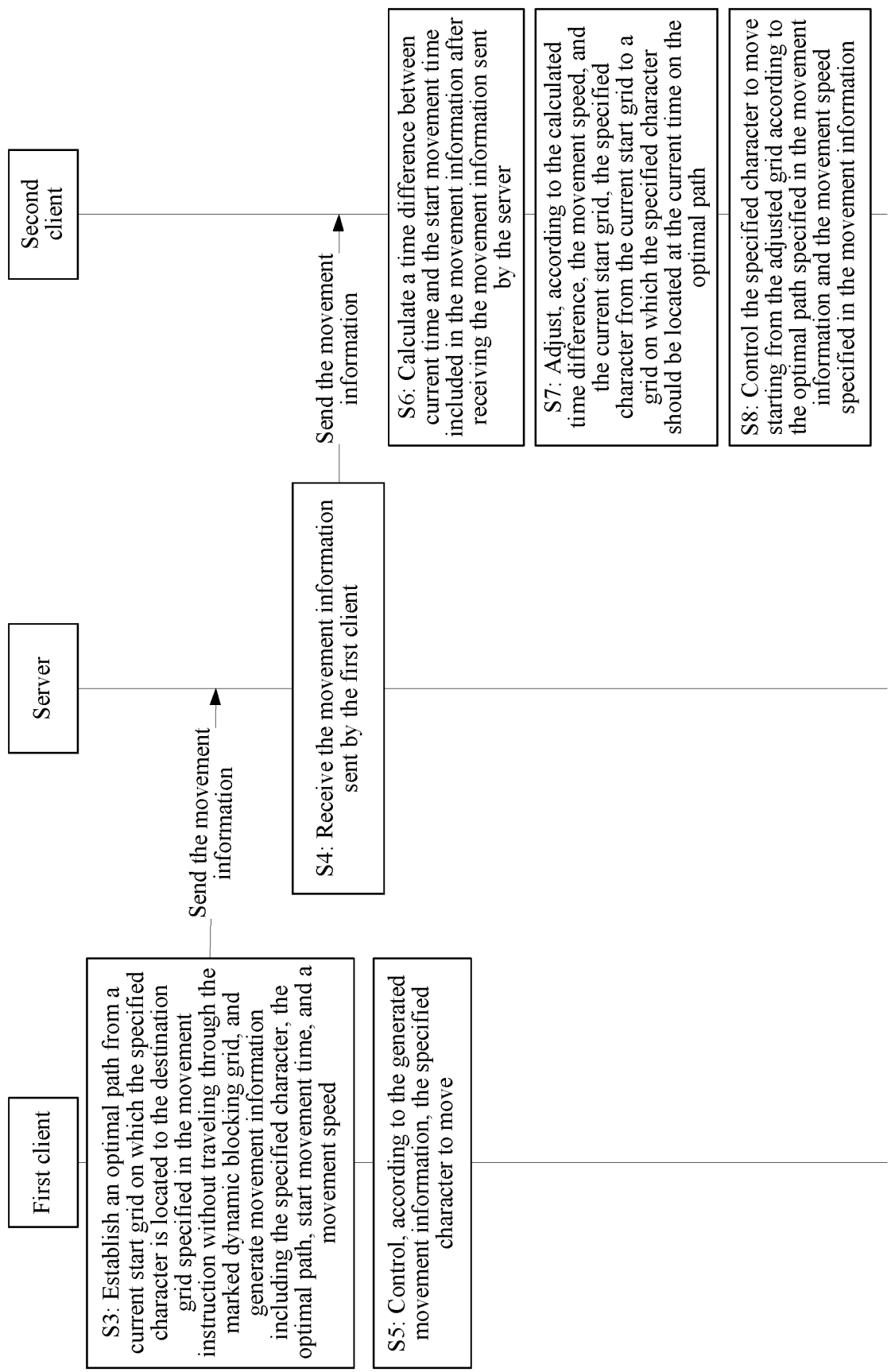
FIG. 3 is a third interaction flowchart of a method of moving a character in an online game according to an embodiment of the present invention.

Preferably, FIG. 3 shows a third interaction flowchart of a method of moving a character in an online game according to an embodiment of the present invention. For ease of description, only the part related to this embodiment of the present invention is shown. Based on the second interaction flowchart of the method of moving a character in an online game, if the server checks that the movement information sent by the first client meets the rule, the method of moving a character in an online game further includes:

S6: A second client calculates a time difference between current time and the start movement time included in the movement information after receiving the movement information sent by the server, where the second client is all the clients except the first client.

S7: The second client adjusts, according to the calculated time difference, the movement speed, and the current start grid, the specified character from the current start grid to a grid on which the specified character should be located at the current time on the optimal path.

S8: The second client controls the specified character to move starting from the adjusted grid according to the optimal path specified in the movement information and the movement speed specified in the movement information.

Specifically, in this embodiment, because a latency occurs when the first client sends the movement information to the server through a network, the server checks whether the movement information meets the rule, and the server sends the movement information to the second client, after each second client (all the clients except the first client) receives the movement information sent by the server, each second client needs to calculates a difference between current time (that is, time at which a time difference is calculated) and the start movement time included in the movement information, and use the calculated difference as the time difference.

Further, all the clients except the first client can determine, according to the calculated time difference, the movement speed, and the current start grid, a grid on which the specified character should be located at the current time; and each second client adjusts the specified character to the grid on which the specified character should be located at the current time. In this case, an implementation manner of controlling, by each second client according to the movement information, the specified character to move specifically is: controlling the specified character to move starting from the adjusted grid (the grid on which the specified character should be located at the current time) according to the optimal path specified in the movement information, and when moving along the optimal path, move according to the movement speed specified in the movement information.

In this way, the specified character separately controlled by each client and the server is located at a same grid at a same moment, and the client and the server achieve synchronous control and accurate control on the specified character.

Figure 4:
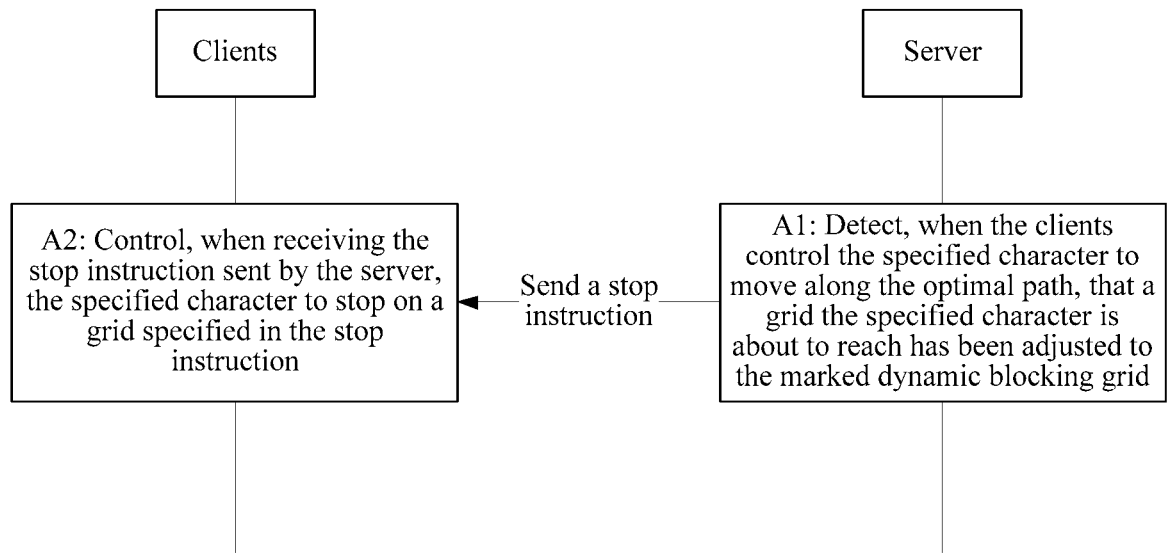
FIG. 4 is a fourth interaction flowchart of a method of moving a character in an online game according to an embodiment of the present invention.

FIG. 4 shows a fourth interaction flowchart of a method of moving a character in an online game according to an embodiment of the present invention. For ease of description, only the part related to this embodiment of the present invention is shown.

In an embodiment of the present invention, as shown in FIG. 4, the method of moving a character in an online game further includes:

A1: The server sends, when the clients control the specified character to move along the optimal path, a stop instruction to the clients if the server detects that a grid the specified character is about to reach has been adjusted to the marked dynamic blocking grid.

A2: The clients control, when receiving the stop instruction sent by the server, the specified character to stop on a grid specified in the stop instruction, where the grid specified in the stop instruction is a preceding grid, during movement along the optimal path, neighboring to the grid the specified character is about to reach.

Specifically, because one client may control one or more game characters to move, and each client may simultaneously control a game character to move, in this case, a large number of game characters move within a same time period. Therefore, after each client generates movement information for controlling the specified character to move, when the specified character is controlled to move along the optimal path, as time goes on, another game character may first occupy a dynamic blocking grid on the optimal path. Further, if when the specified character is moved along the optimal path, the specified character is about to reach a grid, the grid the specified character is about to reach is just occupied by another game character. In this case, each client still controls the specified character to keep moving; however, in the meanwhile, the server generates a stop instruction when detecting that the grid the specified character is about to reach is just occupied by the another game character, to instruct, by using the stop instruction, each client to adjust a grid on which the specified character should be located at current time.

Further, after the client receives the stop instruction sent by the server, the client adjusts the specified character to the grid, recorded by the server, on which the specified character should be located, that is, the client adjusts the specified character to a preceding grid that is on the optimal path and is, during movement along the optimal path, neighboring to the grid the specified character is about to reach, where the preceding grid and the grid the specified character is about to reach are two grids the specified character is controlled along the optimal path to successively travel through.

In an embodiment of the present invention, the step of acquiring, by the first client, a game map including a marked dynamic blocking grid specifically is:

acquiring, by the first client, a game map including a static blocking grid, the dynamic blocking grid, and a non-blocking grid, where the dynamic blocking grid further includes an unmarked dynamic blocking grid, where the unmarked dynamic blocking grid is a dynamic blocking grid on which no game character exists; and the step of establishing, by the first client, an optimal path from a current start grid on which the specified character is located to the destination grid specified in the movement instruction without traveling through the marked dynamic blocking grid specifically is:

establishing, by the first client, an optimal path starting from the current start grid, traveling through the non-blocking grid and/or the unmarked dynamic blocking grid included on the game map, and reaching the destination grid.

It should be noted that, a game character cannot be moved to a static blocking grid on the game map. Generally, objects such as a tree, a door, and a wall are set on one or more static blocking grids. In addition, some game maps further have a non-blocking grid, where multiple game characters can be simultaneously moved to the non-blocking grid; generally, straw, shallow water, and other scenes are set on one or more non-blocking grids.

Further, in this embodiment, when the first client determines the optimal path (a path with a shortest distance between the current start grid and the destination grid), not only the marked dynamic blocking grid is considered (that is, the optimal path cannot travel through the marked dynamic blocking grid), but also the static blocking grid is considered (that is, the optimal path cannot travel through the static blocking grid); therefore, the generated optimal path travels through only the non-blocking grid and/or the unmarked dynamic blocking grid.

Generally, malicious software such as plug-in software tries to travel through the static blocking grid and/or the marked dynamic blocking grid when manipulating a game character. Therefore, to prevent the malicious software such as plug-in software from manipulating the game character to move in a rule disobeying manner, when receiving the movement information sent by the first client, the server checks whether the optimal path included in the movement information includes the static blocking grid and/or the marked dynamic blocking grid, and sends an adjustment instruction to the first client if the optimal path includes the static blocking grid and/or the marked dynamic blocking grid; and the first client moves, according to the adjustment instruction, the specified character back to a current start grid recorded by the server.

In a preferred embodiment of the present invention, the step of establishing, by the first client, an optimal path from a current start grid on which the specified character is located to the destination grid specified in the movement instruction without traveling through the marked dynamic blocking grid specifically is:

establishing, by the first client according to a shortest distance algorithm, a shortest path from the current start grid on which the specified character is located to the destination grid specified in the movement instruction without traveling through the marked dynamic blocking grid, and using the established shortest path as the optimal path.

Specifically, the algorithm used in determining the optimal path from the current start grid to the destination grid is a shortest distance algorithm, and a shortest path from the current start grid to the destination grid can be obtained by using the shortest distance algorithm. In this embodiment, when the optimal path from the current start grid to the destination grid is determined by using the shortest distance algorithm, the marked dynamic blocking grid further needs to be considered. In this way, for the optimal path determined by using the shortest distance algorithm, on the premise that it is ensured that the determined optimal path does not travel through the marked dynamic blocking grid, the determined optimal path is the shortest path from the current start grid to the destination grid.

In another embodiment of the present invention, the method of moving a character in an online game further includes:

detecting, by the server a preset number of times within a preset time, that movement information sent by a third client includes a wrong path for controlling a third game character to move, disconnecting a game connection to the third client, and generating a location adjustment instruction for adjusting the third game character to a grid, recorded by the server, on which the third game character is located, where the clients include the third client, and the wrong path travels through the static blocking grid and/or the marked dynamic blocking grid; and sending, by the server, the location adjustment instruction to all clients except the third client by group messaging, so that all the clients except the third client adjust the third game character to the grid recorded by the server.

In this embodiment, when a third game character is manipulated on a third client by using malicious software such as plug-in software, generally, the third client sends movement information including a malicious wrong path to the server, hoping to pass a check by the server whether the movement information meets the rule.

However, the server collects movement information sent by each client and received within a preset time, and collects statistics about a client that sends movement information including a wrong path. Because a game character is generally in a moving state, when a client sends movement information including a wrong path under a preset number of times, the server does not determine that the client uses malicious software such as plug-in software, but directly discards the movement information including a wrong path, and sends an adjustment instruction to the client that sends the movement information including a wrong path, to adjust a game character specified in the movement information back to a grid recorded by the server (a grid before movement according to the wrong path).

Once movement information, sent by a same client, including a wrong path is received the preset number of times within the preset time, the server regards the client as a third client, regards a game character specified in the movement information including a wrong path as a third game character, and disconnects a game connection to the third client. In addition, the server generates a location adjustment instruction, and sends a location adjustment instruction to all clients except the third client; and when receiving the location adjustment instruction, all the clients except the third client adjust the third game character to a grid, recorded by the server, on which the third game character is located (a grid before movement according to the wrong path).

In a preferred embodiment of the present invention, the step of generating, by the first client, movement information including the specified character, the optimal path, start movement time, and a movement speed specifically includes:

generating, by the first client, movement information including the current start grid, the specified character, the optimal path, the start movement time, and the movement speed; and after the step of receiving, by the server, the movement information sent by the first client, the method of moving a character in an online game further includes:

detecting, by the server, whether the static blocking grid and/or the marked dynamic blocking grid exists between the current start grid recorded in the movement information and a grid, recorded by the server, on which the specified character is located; and generating, by the server if the static blocking grid and/or the marked dynamic blocking grid exists, a specified adjustment instruction for adjusting the specified character to the grid, recorded by the server, on which the specified character is located, and sending the specified adjustment instruction to all the clients by group messaging, so that all the clients adjust the specified character to the grid recorded by the server.

In this embodiment, specifically, after the server receives the movement information sent by the first client, before the server sends the movement information to all the clients except the first client by group messaging, if detecting that a grid on which the specified character is located on the first client at the start movement time is different from a grid, recorded by the server, on which the specified character is located, and further detecting that at least one static blocking grid and/or at least one marked dynamic blocking grid exists between the current start grid and the grid recorded by the server, the server generates a specified adjustment instruction for adjusting the grid on which the specified character is located, and sends the specified adjustment instruction to the clients by group messaging.

In this way, each client adjusts, according to the specified adjustment instruction, the specified character to the grid, recorded by the server, on which the specified character is located, to ensure that the grid on which the specified character is located is consistent with the grid recorded by the server, thereby achieving synchronous control by the client and the server on the game character.

More preferably, after the step of receiving, by the server, the movement information sent by the first client, the method of moving a character in an online game further includes:

calculating, by the server, the number of grids existing between the current start grid recorded in the movement information and the grid, recorded by the server, on which the specified character is located, and determining whether the calculated number is greater than an interval threshold; and generating, by the server, the specified adjustment instruction if the calculated number is greater than or equal to the interval threshold, and sending the specified adjustment instruction to all the clients by group messaging.

Specifically, after the server receives the movement information sent by the first client, before the server sends the movement information to all the clients except the first client by group messaging, if detecting that a grid on which the specified character is located on the first client at the start movement time is different from a grid, recorded by the server, on which the specified character is located, and further detecting that a grid of which the number reaches an interval threshold exists between the current start grid and the grid recorded by the server, the server generates a specified adjustment instruction for adjusting the grid on which the specified character is located, and sends the specified adjustment instruction to the clients by group messaging.

In this way, each client adjusts, according to the specified adjustment instruction, the specified character to the grid, recorded by the server, on which the specified character is located, to ensure that the grid on which the specified character is located is consistent with the grid recorded by the server, and further ensure that after the server and the client separately control the specified character to move along the optimal path, the specified character can reach a same destination grid, thereby achieving synchronous control by the client and the server on the specified character.

A person of ordinary skill in the art may further understand that all or some of the steps in the foregoing method embodiments may be implemented by a program instructing relevant hardware. The program may be stored in a computer readable storage medium, and the storage medium may be a ROM/RAM, a magnetic disk, an optical disc, and the like.

It should be noted that, a system of moving a character in an online game provided in an embodiment of the present invention and the method of moving a character in an online game provided in the embodiments of the present invention are applicable to each other.

Figure 5:
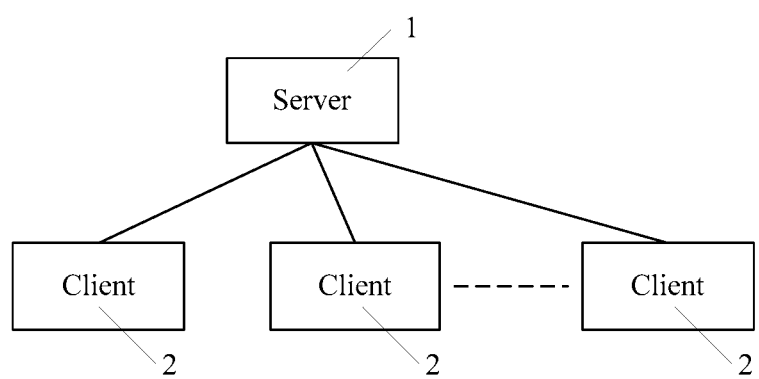
FIG. 5 is a system architectural diagram of a system of moving a character in an online game according to an embodiment of the present invention.

FIG. 5 shows a system architecture of a system of moving a character in an online game according to an embodiment of the present invention. For ease of description, only the part related to this embodiment of the present invention is shown. As shown in FIG. 5, the system of moving a character in an online game provided in this embodiment includes a server 1, and further includes at least two clients 2, that is, the system of moving a character in an online game is a game system constructed by the server 1 and the clients 2.

Figure 6:
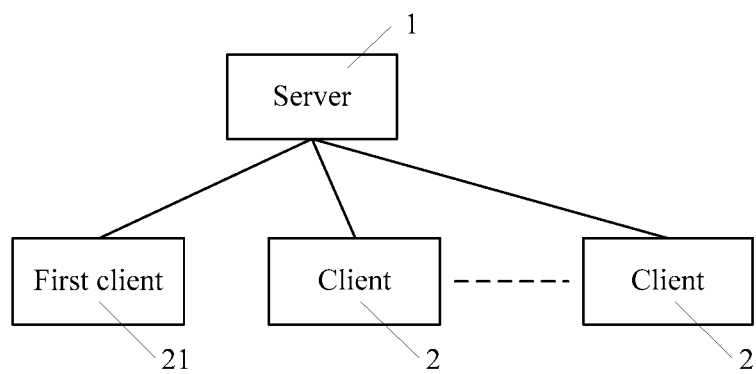
FIG. 6 is a system architectural diagram of a system of moving a character in an online game including a first client according to an embodiment of the present invention.

It should be noted that, the clients 2 include a first client 21 and a second client. FIG. 6 shows a system architecture of a system of moving a character in an online game including a first client 21 according to an embodiment of the present invention. For ease of description, only the part related to this embodiment of the present invention is shown.

The first client 21 is configured to receive a movement instruction for a specified character, where the movement instruction includes a destination grid;

the first client 21 is further configured to acquire a game map including a marked dynamic blocking grid, where the marked dynamic blocking grid is a dynamic blocking grid on which a game character exists;

the first client 21 is further configured to establish an optimal path from a current start grid on which the specified character is located to the destination grid specified in the movement instruction without traveling through the marked dynamic blocking grid, generate movement information including the specified character and the optimal path, and send the movement information to the server 1; and the server 1 is configured to receive the movement information sent by the first client 21, and send the movement information to all clients 2 except the first client 21 by group messaging.

In an embodiment of the present invention, the first client 21 is further specifically configured to acquire a game map including a static blocking grid, the dynamic blocking grid, and a non-blocking grid, where the dynamic blocking grid further includes an unmarked dynamic blocking grid, where the unmarked dynamic blocking grid is a dynamic blocking grid on which no game character exists; and the first client 21 is further specifically configured to establish an optimal path starting from the current start grid, traveling through the non-blocking grid and/or the unmarked dynamic blocking grid included on the game map, and reaching the destination grid.

Figure 7:
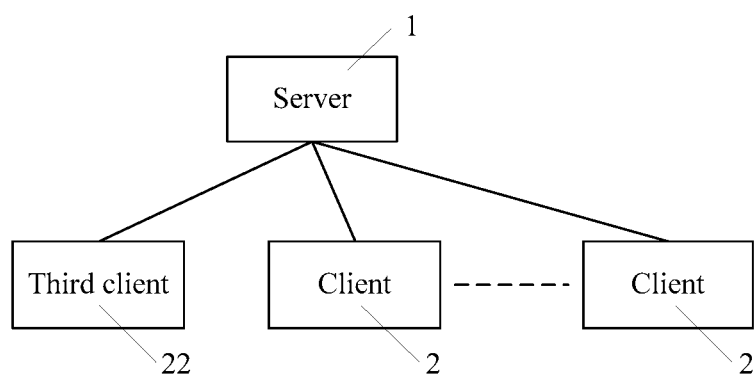
FIG. 7 is a system architectural diagram of a system of moving a character in an online game including a third client according to an embodiment of the present invention.

In an embodiment of the present invention, the clients 2 include a third client 22. FIG. 7 shows a system architecture of a system of moving a character in an online game including a third client 22 according to an embodiment of the present invention. For ease of description, only the part related to this embodiment of the present invention is shown.

The server 1 is further configured to detect, a preset number of times within a preset time, that movement information sent by the third client 22 includes a wrong path for controlling a third game character to move, disconnect a game connection to the third client 22, and generate a location adjustment instruction for adjusting the third game character to a grid, recorded by the server 1, on which the third game character is located, where the wrong path travels through the static blocking grid and/or the marked dynamic blocking grid; and is further configured to send the location adjustment instruction to all clients 2 except the third client 22 by group messaging, so that all the clients 2 except the third client 22 adjust the third game character to the grid recorded by the server 1.

In an embodiment of the present invention, the first client 21 is further configured to establish, according to a shortest distance algorithm, a shortest path from the current start grid on which the specified character is located to the destination grid specified in the movement instruction without traveling through the marked dynamic blocking grid, and use the established shortest path as the optimal path.

In an embodiment of the present invention, the first client 21 is further configured to generate movement information including the specified character, the optimal path, start movement time, and a movement speed after establishing the optimal path; and control, according to the generated movement information, the specified character to move.

In an embodiment of the present invention, the clients 2 further include a second client, where the second client is all the clients 2 except the first client 21, where the second client is configured to calculate a time difference between current time and the start movement time included in the movement information after receiving the movement information sent by the server 1;

the second client is further configured to adjust, according to the calculated time difference, the movement speed, and the current start grid, the specified character from the current start grid to a grid on which the specified character should be located at the current time on the optimal path; and the second client is further configured to control the specified character to move starting from the adjusted grid according to the optimal path specified in the movement information and the movement speed specified in the movement information.

In an embodiment of the present invention, the first client 21 is further specifically configured to generate movement information including the current start grid, the specified character, the optimal path, the start movement time, and the movement speed; and the server 1 is further configured to detect whether the static blocking grid and/or the marked dynamic blocking grid exists between the current start grid recorded in the movement information and a grid, recorded by the server 1, on which the specified character is located; and generate, if the static blocking grid and/or the marked dynamic blocking grid exists, a specified adjustment instruction for adjusting the specified character to the grid, recorded by the server 1, on which the specified character is located, and send the specified adjustment instruction to all the clients 2 by group messaging, so that all the clients 2 adjust the specified character to the grid recorded by the server 1.

In an embodiment of the present invention, the server 1 is further configured to calculate the number of grids existing between the current start grid recorded in the movement information and the grid, recorded by the server 1, on which the specified character is located, and determine whether the calculated number is greater than an interval threshold; and generate the specified adjustment instruction if the calculated number is greater than or equal to the interval threshold, and send the specified adjustment instruction to all the clients 2 by group messaging.

In an embodiment of the present invention, the server 1 is further configured to send, when the clients 2 control the specified character to move along the optimal path, a stop instruction to the clients 2 if detecting that a grid the specified character is about to reach has been adjusted to the marked dynamic blocking grid; and the clients 2 are further configured to control, when receiving the stop instruction sent by the server 1, the specified character to stop on a grid specified in the stop instruction, where the grid specified in the stop instruction is a preceding grid, during movement along the optimal path, neighboring to the grid the specified character is about to reach.

The foregoing content is merely detailed descriptions made on the present disclosure by using specific preferred implementation manners, and it should not be regarded that specific embodiments of the present invention are limited to these descriptions. A person of ordinary skill in the art may make several equivalent replacements or obvious variations without departing from the conception of the present disclosure to achieve the same performance or purposes, and such replacements and variations should be construed as falling within the patent protection scope determined by the claims submitted by the present disclosure.

What is claimed is:

1. A method of moving a character in an online game, applied to a system of moving the character constructed by a server and at least two clients, the method of moving the character in the online game comprising:

receiving, by a first client, a movement instruction for the character called a specified character, the movement instruction comprising a destination grid, and the clients comprising the first client;

acquiring, by the first client, a game map comprising a marked dynamic blocking grid, the marked dynamic blocking grid being a dynamic blocking grid on which a game character other than the specified character exists;

establishing, by the first client, an optimal path from a current start grid on which the specified character is located to the destination grid specified in the movement instruction without traveling through the marked dynamic blocking grid, generating movement information comprising the specified character and the optimal path, and sending the movement information to the server; and receiving, by the server, the movement information sent by the first client, and sending the movement information to all clients except the first client by group messaging;

wherein the step of acquiring, by the first client, the game map comprising the marked dynamic blocking grid specifically is:

acquiring, by the first client, the game map comprising a static blocking grid, a dynamic blocking grid, and a non-blocking grid, wherein the dynamic blocking grid comprises the marked dynamic blocking grid and an unmarked dynamic blocking grid, wherein the unmarked dynamic blocking grid is a dynamic blocking grid on which no game character exists; and the step of establishing, by the first client, the optimal path from the current start grid on which the specified character is located to the destination grid specified in the movement instruction without traveling through the marked dynamic blocking grid specifically is:

establishing, by the first client, the optimal path starting from the current start grid, traveling through at least one of the non-blocking grid or the unmarked dynamic blocking grid comprised on the game map, and reaching the destination grid.

2. The method of moving the character in the online game according to claim 1, further comprising:

detecting, by the server a preset number of times within a preset time, that movement information sent by a third client comprises a wrong path for controlling a third game character to move, disconnecting a game connection to the third client, and generating a location adjustment instruction for adjusting the third game character to a grid, recorded by the server, on which the third game character is located, wherein the clients comprise the third client, and the wrong path travels through at least one of the static blocking grid or the marked dynamic blocking grid; and sending, by the server, the location adjustment instruction to all clients except the third client by group messaging, so that all the clients except the third client adjust the third game character to the grid recorded by the server.

3. The method of moving the character in the online game according to claim 1, wherein the step of establishing, by the first client, the optimal path from the current start grid on which the specified character is located to the destination grid specified in the movement instruction without traveling through the marked dynamic blocking grid specifically is:

establishing, by the first client according to a shortest distance algorithm, a shortest path from the current start grid on which the specified character is located to the destination grid specified in the movement instruction without traveling through the marked dynamic blocking grid, and using the established shortest path as the optimal path.

4. The method of moving the character in the online game according to claim 1, wherein the step of generating the movement information comprising the specified character and the optimal path specifically is: generating, by the first client, the movement information comprising the specified character, the optimal path, start movement time, and a movement speed after establishing the optimal path; and the method of moving the character in the online game further comprises: controlling, by the first client according to the generated movement information, the specified character to move.

5. The method of moving the character in the online game according to claim 4, further comprising:

calculating, by a second client, a time difference between current time and the start movement time comprised in the movement information after receiving the movement information sent by the server, wherein the second client is all the clients except the first client;

adjusting, by the second client according to the calculated time difference, the movement speed, and the current start grid, the specified character from the current start grid to a grid on which the specified character should be located at the current time on the optimal path; and controlling, by the second client, the specified character to move starting from the adjusted grid according to the optimal path specified in the movement information and the movement speed specified in the movement information.

6. The method of moving the character in the online game according to claim 4, wherein the step of generating, by the first client, the movement information comprising the specified character, the optimal path, the start movement time, and the movement speed specifically comprises:

generating, by the first client, the movement information comprising the current start grid, the specified character, the optimal path, the start movement time, and the movement speed; and after the step of receiving, by the server, the movement information sent by the first client, the method of moving the character in the online game further comprises:

detecting, by the server, whether at least one of a static blocking grid or the marked dynamic blocking grid exists between the current start grid recorded in the movement information and a grid, recorded by the server, on which the specified character is located; and generating, by the server if the at least one of the static blocking grid or the marked dynamic blocking grid exists, a specified adjustment instruction for adjusting the specified character to the grid, recorded by the server, on which the specified character is located, and sending the specified adjustment instruction to the clients by group messaging, so that the clients adjust the specified character to the grid recorded by the server.

7. The method of moving the character in the online game according to claim 6, wherein after the step of receiving, by the server, the movement information sent by the first client, the method of moving the character in the online game further comprises:

calculating, by the server, a number of grids existing between the current start grid recorded in the movement information and the grid, recorded by the server, on which the specified character is located, and determining whether the calculated number is greater than an interval threshold; and generating, by the server, the specified adjustment instruction if the calculated number is greater than or equal to the interval threshold, and sending the specified adjustment instruction to the clients by group messaging.

8. The method of moving the character in the online game according to claim 1, further comprising:

sending, by the server when the clients control the specified character to move along the optimal path, a stop instruction to the clients if the server detects that a grid the specified character is about to reach has been adjusted to the marked dynamic blocking grid; and controlling, by the clients when receiving the stop instruction sent by the server, the specified character to stop on a grid specified in the stop instruction, wherein the grid specified in the stop instruction is a preceding grid, during movement along the optimal path, neighboring to the grid the specified character is about to reach.

9. A system of moving a character in an online game, comprising a server, and further comprising at least two clients, the clients comprising a first client, the first client being configured to receive a movement instruction for the character called a specified character, the movement instruction comprising a destination grid;

the first client being further configured to acquire a game map comprising a marked dynamic blocking grid, the marked dynamic blocking grid being a dynamic blocking grid on which a game character other than the specified character exists;

the first client being further configured to establish an optimal path from a current start grid on which the specified character is located to the destination grid specified in the movement instruction without traveling through the marked dynamic blocking grid, generate movement information comprising the specified character and the optimal path, and send the movement information to the server; and the server being configured to receive the movement information sent by the first client, and send the movement information to all clients except the first client by group messaging;

wherein the first client is further configured to acquire the game map comprising a static blocking grid, a dynamic blocking grid, and a non-blocking grid, wherein the dynamic blocking grid further comprises the marked dynamic blocking grid and an unmarked dynamic blocking grid, wherein the unmarked dynamic blocking grid is a dynamic blocking grid on which no game character exists; and the first client is further configured to establish the optimal path starting from the current start grid, traveling through at least one of the non-blocking grid or the unmarked dynamic blocking grid comprised on the game map, and reaching the destination grid.

10. The system of moving the character in the online game according to claim 9, wherein the clients comprise a third client; and the server is further configured to detect, a preset number of times within a preset time, that movement information sent by the third client comprises a wrong path for controlling a third game character to move, disconnect a game connection to the third client, and generate a location adjustment instruction for adjusting the third game character to a grid, recorded by the server, on which the third game character is located, wherein the wrong path travels through at least one of the static blocking grid or the marked dynamic blocking grid; and is further configured to send the location adjustment instruction to all clients except the third client by group messaging, so that all the clients except the third client adjust the third game character to the grid recorded by the server.

11. The system of moving the character in the online game according to claim 9, wherein
the first client is further configured to establish, according to a shortest distance algorithm, a shortest path from the current start grid on which the specified character is located to the destination grid specified in the movement instruction without traveling through the marked dynamic blocking grid, and use the established shortest path as the optimal path.

12. The system of moving the character in the online game according to claim 9, wherein
the first client is further configured to generate the movement information comprising the specified character, the optimal path, start movement time, and a movement speed after establishing the optimal path; and control, according to the generated movement information, the specified character to move.

13. The system of moving the character in the online game according to claim 12, wherein the clients further comprise a second client, wherein the second client is all the clients except the first client, wherein
the second client is configured to calculate a time difference between current time and the start movement time comprised in the movement information after receiving the movement information sent by the server;
the second client is further configured to adjust, according to the calculated time difference, the movement speed, and the current start grid, the specified character from the current start grid to a grid on which the specified character should be located at the current time on the optimal path; and
the second client is further configured to control the specified character to move starting from the adjusted grid according to the optimal path specified in the movement information and the movement speed specified in the movement information.

14. The system of moving the character in the online game according to claim 12, wherein
the first client is further specifically configured to generate the movement information comprising the current start grid, the specified character, the optimal path, the start movement time, and the movement speed; and
the server is further configured to detect whether at least one of a static blocking grid or the marked dynamic blocking grid exists between the current start grid recorded in the movement information and a grid, recorded by the server, on which the specified character is located; and generate, if the at least one of the static blocking grid or the marked dynamic blocking grid exists, a specified adjustment instruction for adjusting the specified character to the grid, recorded by the server, on which the specified character is located, and send the specified adjustment instruction to the clients by group messaging, so that the clients adjust the specified character to the grid recorded by the server.

15. The system of moving the character in the online game according to claim 14, wherein
the server is further configured to calculate a number of grids existing between the current start grid recorded in the movement information and the grid, recorded by the server, on which the specified character is located, and determine whether the calculated number is greater than an interval threshold; and generate the specified adjustment instruction if the calculated number is greater than or equal to the interval threshold, and send the specified adjustment instruction to the clients by group messaging.

16. The system of moving the character in the online game according to claim 9, wherein the server is further configured to send, when the clients control the specified character to move along the optimal path, a stop instruction to the clients if detecting that a grid the specified character is about to reach has been adjusted to the marked dynamic blocking grid; and
the clients are further configured to control, when receiving the stop instruction sent by the server, the specified character to stop on a grid specified in the stop instruction, wherein the grid specified in the stop instruction is a preceding grid, during movement along the optimal path, neighboring to the grid the specified character is about to reach.

* * * * *